United States Patent [19]

Wang et al.

[11] Patent Number: 5,757,929
[45] Date of Patent: *May 26, 1998

[54] AUDIO INTERFACE GARMENT AND COMMUNICATION SYSTEM FOR USE THEREWITH

[75] Inventors: Weijia Wang, Sunnyvale; Daniel A. Shurman; Margaret Diane Rezvan Minsky, both of Palo Alto, all of Calif.

[73] Assignee: Interval Research Corporation, Palo Alto, Calif.

[*] Notice: The term of this patent shall not extend beyond the expiration date of Pat. No. 5,563,951.

[21] Appl. No.: 711,468

[22] Filed: Sep. 11, 1996

Related U.S. Application Data

[63] Continuation of Ser. No. 280,185, Jul. 25, 1994, Pat. No. 5,563,951.
[51] Int. Cl.⁶ .............................. H04R 5/00; H04B 1/034
[52] U.S. Cl. ........................ 381/24; 381/187; 381/188; 381/205; 455/100; 455/350; 455/351; 455/575
[58] Field of Search .................................. 381/24, 25, 79, 381/74, 187, 188, 205; 455/89, 90, 100, 350, 351, 66, 569, 575; 379/202; 348/14, 15

[56] References Cited

U.S. PATENT DOCUMENTS

| | | | |
|---|---|---|---|
| 3,114,105 | 12/1963 | Neumiller | 455/351 |
| 3,370,236 | 2/1968 | Walker | 455/100 |
| 3,916,312 | 10/1975 | Campbell | 455/351 |
| 4,070,553 | 1/1978 | Hass | 381/151 |
| 4,322,585 | 3/1982 | Liautaud | |
| 4,539,700 | 9/1985 | Sato | 455/351 |
| 4,589,134 | 5/1986 | Waldron | |
| 4,726,070 | 2/1988 | Buzzi | 455/351 |
| 4,815,132 | 3/1989 | Minami | 381/1 |
| 4,819,270 | 4/1989 | Lombardo | |
| 4,876,724 | 10/1989 | Suzuki | 381/187 |
| 5,148,002 | 9/1992 | Kuo et al. | 219/211 |
| 5,212,734 | 5/1993 | Tsao | 381/24 |
| 5,251,326 | 10/1993 | Silverman | 455/90 |
| 5,335,011 | 8/1994 | Addeo et al. | 348/15 |
| 5,491,743 | 2/1996 | Shiio et al. | 379/202 |
| 5,495,357 | 2/1996 | Osterhout | 455/66 |
| 5,563,951 | 10/1996 | Wang et al. | 381/205 |

Primary Examiner—Curtis A. Kuntz
Assistant Examiner—Xu Mei
Attorney, Agent, or Firm—Brooks & Kushman P.C.

[57] ABSTRACT

A personal communications apparatus using a garment-based audio interface includes a garment member worn on the upper torso of a person, wherein the garment member includes a neck opening which allows extension therethrough of the neck of the person. An audio output device capable of producing hi-fidelity spatialized 3-D sound aiming in selected directions is located adjacent the neck opening of the garment member. A receiver capable of receiving at least one transmitted signal and producing an audio signal based thereupon is coupled to the audio output device. An audio input device capable of capturing spatialized 3-D sound from selected directions is located adjacent the neck opening of the garment member. The audio signal from the audio input device is provided to a transmitter capable of transmitting a signal in dependence upon the audio signal. Embodiments of the garment member include a shirt and a necklace.

9 Claims, 3 Drawing Sheets

5,757,929

AUDIO INTERFACE GARMENT AND COMMUNICATION SYSTEM FOR USE THEREWITH

This is a continuation of application Ser. No. 08/280,185 filed on Jul. 25, 1994, now U.S. Pat. No. 5,563,951.

TECHNICAL FIELD

The present invention relates generally to personal communication systems and, more particularly, to audio interfaces for use with personal communication systems.

BACKGROUND ART

Portable, personal communication systems, such as cellular telephones and cordless telephones, are currently experiencing a dramatic growth in utilization. Cellular telephones, for example, have enabled users to transcend the constraints of fixed telephony by allowing communication outside of buildings. In accordance with such trends, society will probably witness a significant wireless evolution in both personal and professional communications which will change the way people conduct their lives at home, on the road, and at work.

Personal communication systems generally include a transmitter-receiver pair along with an audio output device and an audio input device. The audio output device typically comprises speakers, headphones, earphones, or the like. In general terms, audio output devices for use with a personal communication system are devices capable of producing sound waves representative of an electronic audio signal applied thereto, and are employed in contact with the ear of the user. The audio input device typically comprises a microphone or a like transducer. The audio input device is capable of producing an electronic signal representative of sound waves received thereby.

Typically, the audio input and output devices are incorporated on a handset. This arrangement is disadvantageous in that a hand of the user becomes occupied during the communication process. Thus, the user of a handset is limited in the types of activities he/she can perform while simultaneously communicating.

In order to obtain a hands-free system with regard to the audio output device, either headphones or earphones may be employed. Disadvantages of using either headphones or earphones for personal listening result from the ears of the user being partially covered. Consequently, headphones and earphones act to block sound waves produced within the physical environment of the user. Hence, potential safety risks result if the user is performing other tasks while wearing a headphone or an earphone, such as driving a car, crossing a street, or operating a machine. Further, wearing a headphone or an earphone for an extended duration of time grows uncomfortable for many people.

Other disadvantages become evident when interaction is attempted between one person and another person wearing headphones. Often, the one person's speaking and social interaction changes when conversing to the other person wearing headphones, or even a hearing aid. Moreover, these social changes are witnessed even when the one person knows that the other person needs the hearing aid.

In order to obtain a hands-free system with regard to the audio input device, a microphone can be located on a headset, such as is worn by telephone operators and receptionists. Such an arrangement is also socially disadvantageous when attempting to interact with others in her physical space. Furthermore, such an arrangement interferes with a variety of daily activities such as eating or drinking. The use of a headset in a public place is also conspicuous.

Some interface devices have avoided the use of a headset by incorporating an audio output device into a garment worn on the upper torso. However, these prior art devices lack an audio input device to receive input from the user since they were intended as personal music listening systems rather than personal communication systems.

An additional disadvantage of many prior art systems is the inability of these systems to provide and capture high-fidelity sound. These prior art systems distort audio signals to the extent that there is never a question that the sound produced is not natural.

SUMMARY OF THE INVENTION

For the foregoing reasons, the need exists for a personal, portable communication system which allows for hands-free operation, does not physically block the ears of the user, produces high-fidelity sound, and is socially appropriate.

It is thus an object of the present invention to provide an audio interface apparatus for use within a portable communication system which allows for hands-free operation.

Another object of the present invention is to provide an audio interface apparatus for use within a portable communication system whose audio output device does not physically block an ear of the user.

A further object of the present invention is to provide a portable communication system which allows for hands-free operation.

It is also an object of the present invention to provide an array of speakers for transmitting sound in a desired direction.

Yet another object of the present invention is to provide an array of microphones to capture sound from a selected direction.

An additional object of the present invention is to provide a personal communication system that captures and displays high fidelity spatialized sound to allow a plurality of users to access and share each other's auditory space.

In carrying out the above objects, the present invention provides an audio interface apparatus for use with a communication device which includes a receiver capable of receiving at least one transmitted signal and producing a first audio signal based thereupon, and a transmitter capable of transmitting a second signal in dependence upon a second audio signal. A garment member having a neck opening allowing extension therethrough of the neck of a person is worn on the upper torso of the person. An audio output device is secured to the garment member adjacent to the neck opening. The audio output device is coupled to the receiver to produce sound waves representative of the first audio signal. An audio input device is secured to the garment member adjacent to the neck opening. The audio input device is coupled to the transmitter to provide the second audio signal representative of sound waves received thereby.

Further in carrying out the above objects, the present invention provides a personal communications apparatus. A garment member having a neck opening allowing extension therethrough of the neck of a person is worn on the upper torso of the person. An audio output device is secured to the garment member adjacent to the neck opening. The audio output device is coupled to a receiver capable of receiving at least one transmitted signal and producing a first audio signal based thereupon, to produce sound waves representative of the first audio signal. An audio input device is secured to the garment member adjacent to the neck opening. The audio input device is capable of generating a second audio signal representative of sound waves received thereby. A transmitter capable of transmitting a second signal in dependence upon the second audio signal is coupled to the audio input device.

These and other features, aspects, and advantages of the present invention will become better understood with regard to the following description, appended claims, and accompanying drawings.

BEST MODES FOR CARRYING OUT THE INVENTION

The present invention overcomes the disadvantages of the prior art by incorporating an audio input device and an audio output device into an article of clothing or jewelry to be worn on the upper torso of a user. The audio input device and audio output device can be coupled to a transmitter-receiver pair to provide a hands-free personal portable communication system which does not physically block the ears of the user. Moreover, the inconspicuous location of the audio input and audio output devices, specifically near a neck opening of the article of clothing, produces a socially appropriate apparatus.

Figure 1:
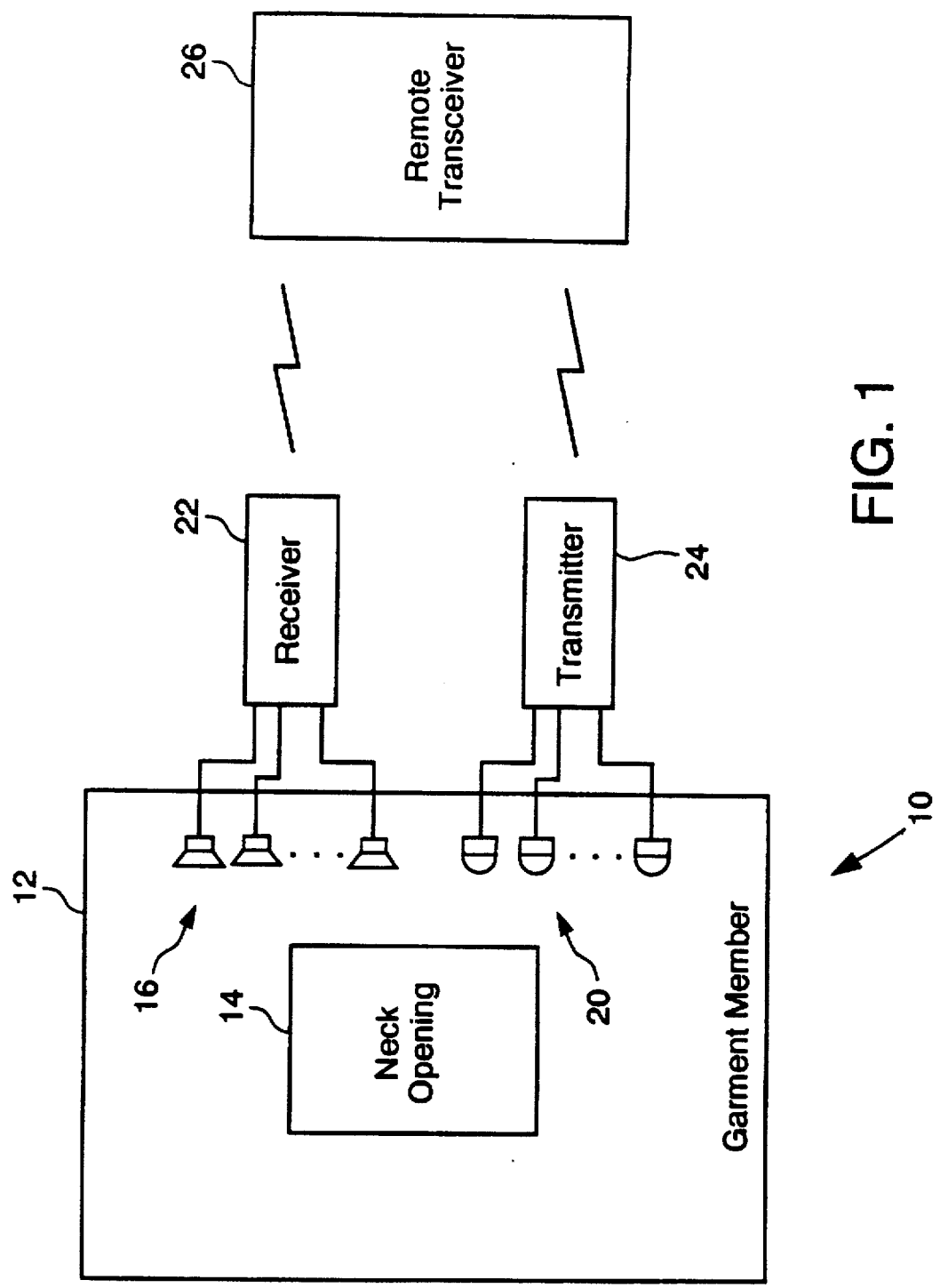
FIG. 1 is a schematic, block diagram of an embodiment of a personal communication system.

Turning now to FIG. 1, a schematic, block diagram representation of one embodiment of a personal communication system is illustrated. The communication system comprises a garment-based audio interface, indicated generally by reference numeral 10. The interface contains a garment member 12 to be worn on the upper torso of a person. The garment member 12 includes a neck opening 14 which allows extension therethrough of the neck of the person. The garment-based audio interface 10 further contains an audio output device 16 located adjacent the neck opening 14. The audio output device 16 is capable of producing sound waves representative of an audio signal applied thereto. Moreover, the garment-based audio interface 10 contains an audio input device 20, also located adjacent the neck opening 14. The audio input device 20 is capable of generating an audio signal representative of sound waves received thereby.

The communication system further includes a receiver 22 capable of producing an audio signal. The audio output device 16 is coupled to the receiver 22 in order to produce sound waves representative of the audio signal. A transmitter 24 is coupled to the audio input device 20. The transmitter is capable of transmitting a signal in dependence upon the audio signal provided by the audio input device 20.

By wearing the garment member 12, a user is provided with a personal listening environment by the sound waves generated by the audio output device 16. The combination of the garment member 12 and the audio output device 16 provides a personal listening apparatus which can be employed in a similar manner as a headphone or an earphone, but does not block the ears of the user. By including the audio input device 20, the receiver 22, and the transmitter 24, a system is provided which allows a user to communicate to a transceiver 26 adapted for use with the receiver 22 and transmitter 24 pair. Sound waves generated by the user speaking in a normal manner are converted into an audio signal by the audio input device 20 for transmission by the transmitter 24. Similarly, the audio output device 16 produces sound waves in response to a signal received by the receiver 22 for listening by the user.

The present invention allows people to mutually access and share their auditory spaces in a telecommunications environment. For example, assume that each person in a group of people is wearing a personal communication system in accordance with the present invention. By using the present invention, a person A can have the following choices regarding her perceived auditory spaces:

The natural auditory space

This can be defined as the auditory space that person A will perceive without wearing the present invention.

Another person B's auditory space

That is, person A may choose to "shut off" her own natural auditory space and experience person B's auditory space.

Merger of A and B's auditory spaces

In this case, A's own space is superimposed with B's auditory space such that A is in two places at the same time. However, A can manipulate B's space. For example, A can rotate, flip, augment, weaken B's space perceived at A's ears by selective mixing of the audio signals received from B. Another example is that if there are multiple sound sources in B's space, A can place each of them to whatever position she would like to with respect to her auditory perception, again, by appropriately mixing these signals.

Merger or mix of multiple spaces

This is a direct extension of the above situation to more than two parties.

Merger or mix of real-time natural and recorded auditory spaces

Recorded auditory spaces may include music, movies, and TV shows. In this case, a merger or mix of natural auditory spaces with synthesized ones can be accomplished.

Thus, the present invention can be described as an audio interface to communication systems that allows users to access and share auditory spaces that are not originally local and natural to them in the full auditory sense. The invention includes the following three subsystems:

1. An audio input device, such as an array of microphones positioned in the upper torso of the human body, such as around the neck. The microphones in the array have the following characteristics:

a) They are electronically controlled such that the amplitude and phase of the signal coming out from each microphone can be varied electronically. One benefit of the electronically controlled audio input device is that users can easily change the directivity of the array so that it will selectively capture the sound sources in the 3-D space.

b) They are located in those places such that (i) at least two of them are as close to the two ears respectively as possible, so that the sound received by the two microphones is similar in nature to that received by the two ears; the rest of the microphones are distributed around the neck and two shoulders, and (ii) they can be supported by human wearables such as collar, shawl, necklace, eyeglasses, etc. so people can wear them comfortably. They are also aesthetically blended into human wearables.

2. An array of speakers positioned in the upper torso of the human body, such as around the neck. The speaker array has the following characteristics:
   a) The speakers are electronically controlled such that the amplitude and phase of the signal going to the speakers from the audio outputs of the communication system can be varied electronically. One benefit of the electronically controlled speaker array is that users can easily change the directivity of the array so that it will concentrate its acoustic energy to desired directions in the 3-D space. Another benefit is that the user can manipulate the receive auditory space to reposition remote sound sources in her own 3-D auditory space.
   b) The speakers are located in the places where they do not cover the ears like a headphone does, block ear canals like earphones or hearing aids do, or apply forces to the human body to cause any discomfort. This way, users perceive the maximum naturalness of the auditory spaces received remotely through the transducers.
   c) The audio signals to the speakers are pre-processed, taking into account the effects of the speaker characteristics, the speakers' positions relative to the ears, the shape of the upper torso including shoulder, neck and head such that the sounds coming from the speaker are as realistic as natural sound.
3. A communications system such as a radio transceiver with a signal processing functional block that is capable of transmitting and receiving a signal carrying a high-fidelity 3-D sound from multiple remote sources and processing the audio signal in various manners.

Figure 2:
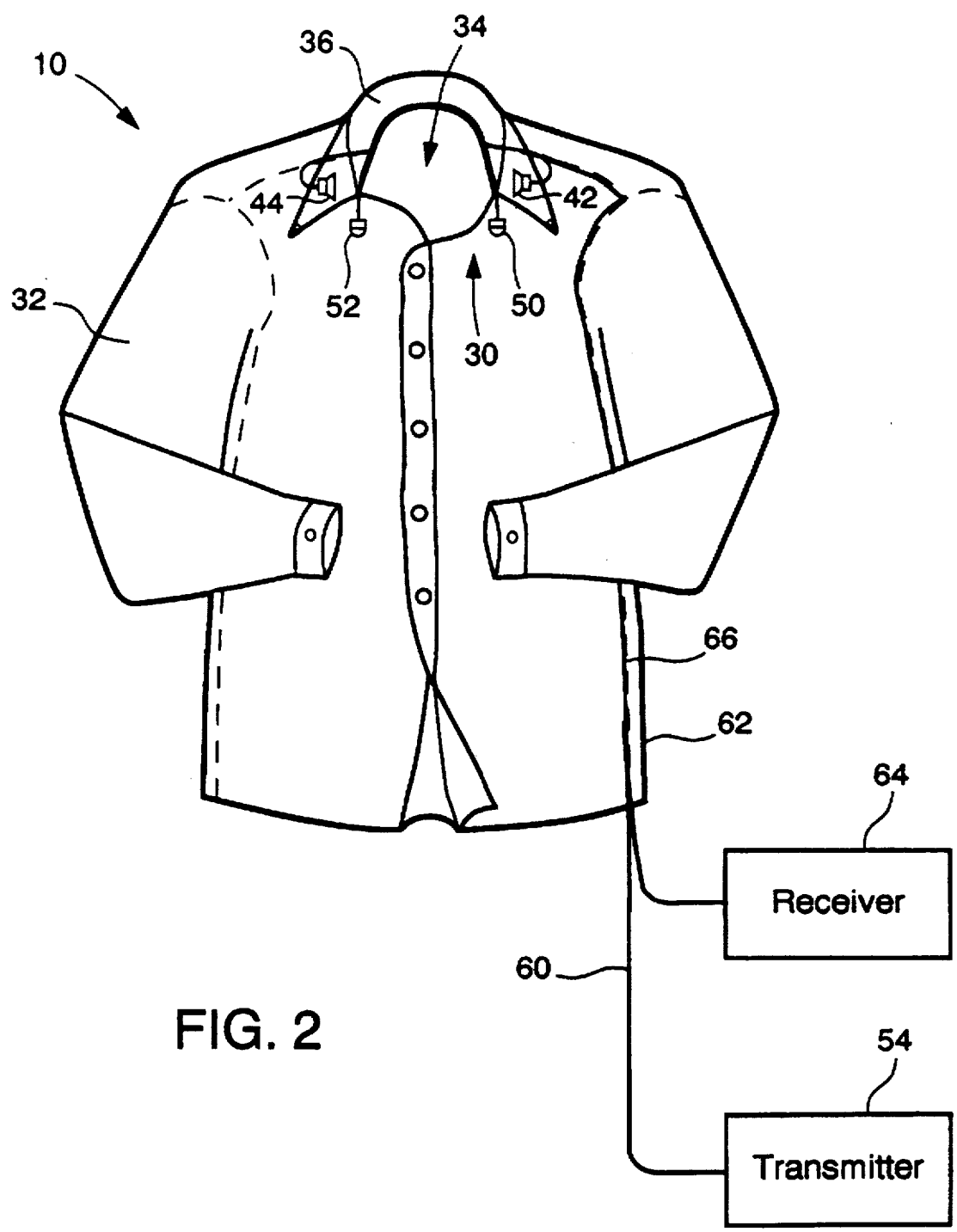
FIG. 2 illustrates an embodiment of a personal communication system in accordance with the present invention.

FIG. 2 illustrates a more specific embodiment of a personal communication system in accordance with the present invention. The communication system includes a garment-based audio interface, indicated generally by reference numeral 30. The interface 30 contains a garment member comprising a shirt 32 to be worn on the upper torso of a person. Although the shirt 32 in FIG. 2 is illustrated as a button-down shirt, other types of shirts including a T-shirt, a sweatshirt, a vest, or a jacket can be employed. The shirt 32 includes a neck opening 34 allowing extension therethrough of the neck of the person. Located adjacent to the neck opening 34 is a collar 36. The collar 36 can be included for purposes of styling of the garment member 32 and concealing of components of the interface 30.

The interface 30 further contains an audio output device comprising a pair of speakers 42 and 44, where one of the speakers 42 is located to the left (from a user's perspective) of the neck opening 34, and where the other of the speakers 44 is located to the right of the neck opening 34. More generally, the audio output device can be comprised of a plurality of speakers. This would be the case when, for example, multiple speakers are employed to produce a desired frequency response, or when more than two speakers are spatially positioned to form an enhanced, surround audio environment.

Application of a suitable audio signal to the speakers 42 and 44 produces a personal listening environment for the person wearing the shirt 32. Moreover, the use of the pair of speakers 42 and 44 on either side of the neck opening 34 provides a capability of producing a spatialized audio environment—an audio environment where a user wearing the shirt 32 can discern an apparent direction of one or more sounds produced. In FIG. 2, the speakers 42 and 44 are placed on top of the collar of the shirt. Other alternative placements are possible which conceal the speakers including under the collar and inside the collar adjacent to the wearer's neck. Locating the speakers 42 and 44 within the collar 36 is advantageous in concealing the speakers 42 and 44 from external view. Alternatively, the pair of speakers 42 and 44 can be located at other locations on the shirt 32, such as on corresponding yokes (not shown) or Epaulets (not shown) on either side of the shirt 32.

In the present invention, the exact placement of these speakers can be chosen to provide the desired trade off between audio power transfer to each ear, comfort of the wearer and concealment. The important feature of these speakers is that they create a 3-D audio space for the wearer in which signals can be mixed to vary the perceived "location" of these signals without blocking the wearer's natural auditory environment.

Thus, the speakers of the present invention are positioned and designed to display other user's auditory spaces such that the listener cannot distinguish other's auditory spaces from her own natural auditory space. To this end, it is desirable for the speaker to not be visible to or physically touch the user such that the user would be constantly aware of the presence of these devices. If the user is not intrusively reminded that she is wearing something, it is much easier for the user to assume that the audio output from these speakers are a product of her natural auditory environment. In this manner, a user will feel that other users surround her head, allowing the signals from other users to be mixed and processed further allows the user to "place" the output from the other users in separate locations in her audio space.

It is also desirable to aim and focus the audio output of the speakers of the present invention such that only the listener's ears can hear their audio output. This maintains the privacy of the user's personal communications.

Also contained in the interface 30 is an audio input device comprising a pair of stereo microphones 50 and 52 located adjacent the neck opening 34. From the perspective of the person wearing the shirt 32, one of the microphones 50 is located to the left of the neck opening 34 adjacent to the collarbone of the person. Similarly, the other of the microphones 52 is located near the collarbone and to the right of the neck opening 34. Locating the microphones 50 and 52 within the collar 36 is advantageous in concealing them from external view. Generally, the pair of microphones 50 and 52 are each capable of generating an audio signal representative of sound waves received thereby. The use of two microphones to create a spatialized audio output is preferable. However, any number of microphones greater than two could also be used to create the same effect.

The microphones 50 and 52 are coupled to a transmitter 54 capable of transmitting a signal in dependence upon audio signals provided thereto. Hence, by providing the audio signals from the microphones 50 and 52 to the transmitter 54, the sounds produced within the physical space of a person wearing the garment member are receivable by a remotely-located receiver. In particular, the person can communicate to another person by simply speaking as he/she would in a normal manner. Furthermore, the placement of the microphones 50 and 52 on either side of the user's collarbone provides for a continuous, spatially correct capture of the stereo image of the user's speech, and more generally, the sounds which he/she produces in her physical space.

In general, the microphones should be positioned and designed to capture the 3-D auditory environment around the user. In this way, the party or parties at the other end of the communication can experience the natural 3-D auditory space of the user. Further, the microphones would generally be provided with a directional input characteristic aimed at the user to capture her voice while ignoring, to some extent, the sound sources which may be present from other directions.

The microphones 50 and 52 are coupled to the transmitter 54 by one or more wires 60. If the shirt 32 includes seams, the wires 60 can be located within the seams during manufacture of the shirt 32. For the embodiment of FIG. 1, the wires 60 follow the seams from the collar to the shoulder, to the set-in sleeve seam, and down the side seam to the shirt tail 62. Alternatively, the wires 60 can be located at the interior of the shirt 32, running down from the collar to the shirt tail 62. Another alternative has the wires 60 woven directly into the shirt 32.

In a preferred embodiment, the transmitter 54 includes a radio frequency modulator and an antenna. The transmitter 54 can be formed using a custom-designed transmitter such as a custom FM stereo transmitter, a custom-designed digital radio that can transmit more than two audio streams, or a more conventional transmitter such as one employed in a cellular telephone or a cordless telephone. The transmitter 54 can be physically-located external to the garment member, such as within a belt pack to be worn on the waist of the user.

The speakers 42 and 44 are coupled to a receiver 64, or more generally, any device capable of producing an audio signal. For example, the receiver 64 can be of the form of a portable personal stereo, or of the form of a receiving antenna and a demodulator. In a similar manner as with the transmitter 54, the receiver 64 can be located physically external to the garment member, such as on a belt pack. The receiver 64 can be formed using either a custom-designed receiver, or a more conventional receiver such as one employed in a cellular telephone or a cordless telephone.

The speakers 42 and 44 are coupled to the receiver 64 by one or more wires 66. Alternatives for running the wires 66 from the collar 36 down to the shirt tail 62 include locating the wires 66 within the seams of the shirt 32, locating the wires 66 at the interior of the shirt 32, and weaving the wires 66 directly into the shirt 32.

In this embodiment of the present invention, the microphones, speakers, and communication interface are connected via wires. Wireless methods such as RF or infrared signaling could also be used to effectuate the connections between these components.

Figure 3:
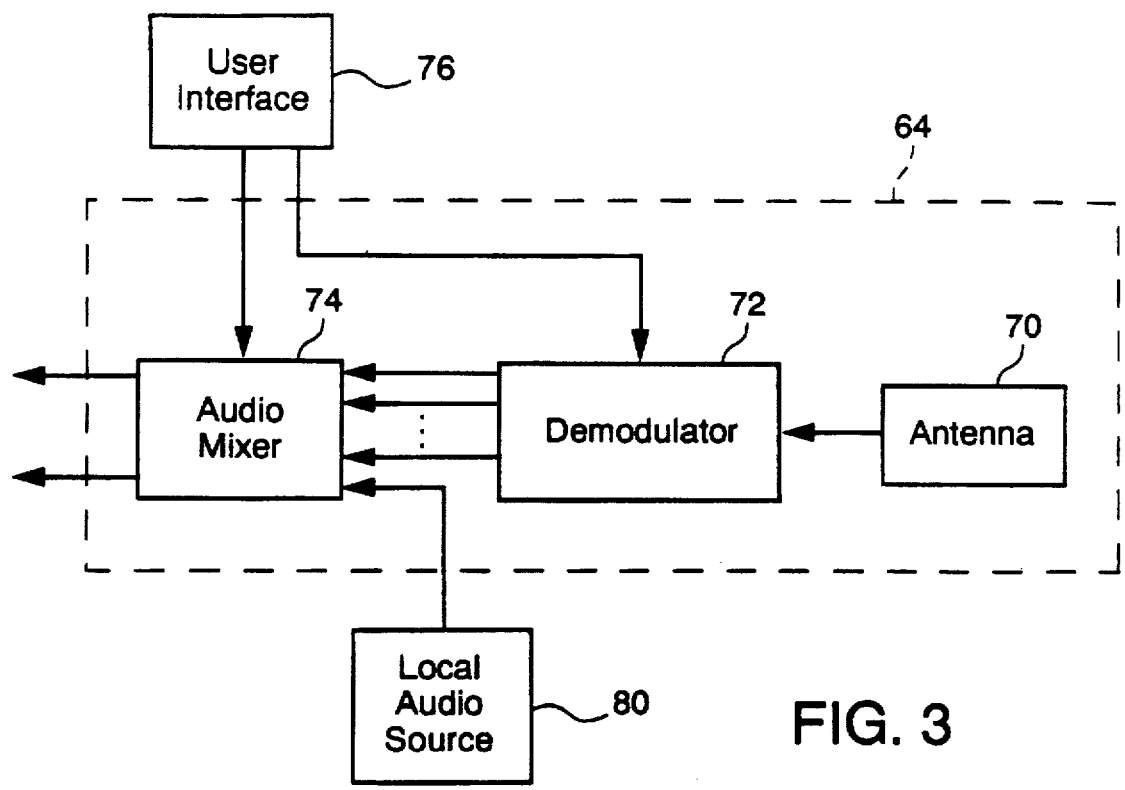
FIG. 3 is a block diagram of a receiver in accordance with the present invention.

FIG. 3 illustrates an embodiment of the receiver 64 in accordance with the present invention. An antenna 70 receives at least one transmitted signal of the radio frequency variety. The at least one transmitted signal is provided to a demodulator 72. The demodulator 72 is capable of producing one or more audio signals based upon the at least one transmitted signal. The one or more audio signals are applied to an audio mixer 74. In response to a control signal provided by a user interface 76, the audio mixer 74 selectively mixes the one or more audio signals to provide audio signals to the speakers 42 and 44. Optionally, the audio mixer 74 is further capable of accepting, as an input, the output of a local audio source 80. As a further option, the user interface 76 can be used to control the demodulator 72. The audio mixer 74 may also contain signal processing capabilities. For example, audio mixer 74 may be used to control the phase of each audio signal output such that speakers 42 and 44 can focus the sound to a desired direction.

Using illustrative examples, the operation of the embodiment in FIG. 3 will now be explained in greater detail. The at least one transmitted signal received by the antenna 70 contains the one or more audio signals by use of a predetermined modulation scheme. Various schemes for simultaneously transmitting one or more signals, such as time division multiplexing and frequency division multiplexing, are well known in the art of communications. In accordance with the predetermined multiplexing scheme employed, the demodulator 72 acts to separate the one or more audio signals for application to the audio mixer 74.

Each of the one or more audio signals is representative of a respective audio source. Examples of audio sources which a user would typically want included are: audio from a telephone receiver, one or more sources of music, and audio from one or more other users having a like personal communications apparatus. Further, the user can provide her own audio source, such as a portable tape player, using the local audio source 80.

The user interface 76 allows the user to selectively control the amplitude and the panning of each of the audio signals applied to the audio mixer 74. For example, if the telephone rings while the user is listening to music, he/she can reduce the volume of the music and increase the volume of the receiver of the telephone using the user interface 76.

Figure 4:
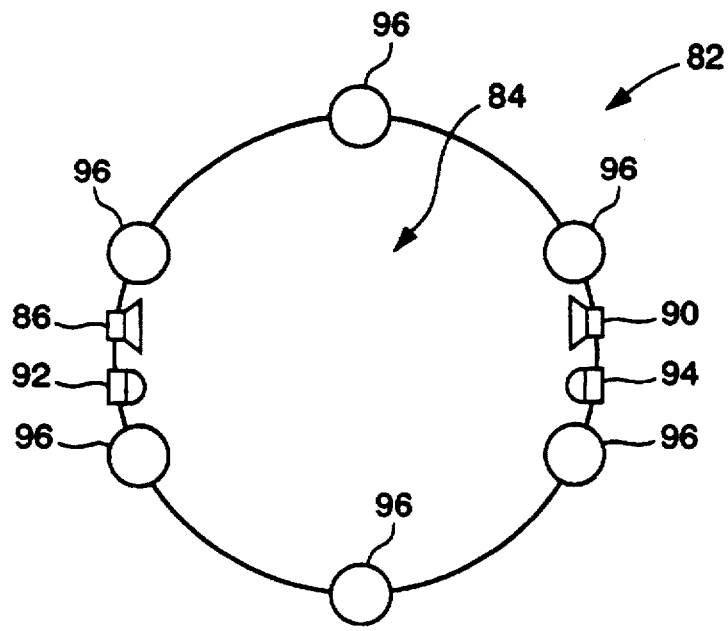
FIG. 4 illustrates an alternative embodiment in accordance with the present invention.

Referring now to FIG. 4, an alternative embodiment of a garment-based audio interface is illustrated. The interface contains a garment member comprising a necklace 82 to be worn around the neck of a person. The necklace 82 includes a neck opening 84 allowing extension therethrough of the neck of the person. The interface further contains an audio output device comprising a pair of speakers 86 and 90 located at opposite sides of the necklace 82. The interface also contains an audio input device comprising a pair of microphones 92 and 94 located at opposite sides of the necklace 82. The necklace 82 can include beads 96 to make the speakers and the microphones less conspicuous. The speakers and the microphones would be coupled to a receiver and a transmitter, respectively, similar to the embodiment of FIG. 2. In addition to the shirt and necklace described in detail herein, the audio interface device of the present invention could also be concealed in other garments such as other forms of jewelry, a hat, shawl or eyeglasses.

The above-described embodiments of the present invention have many advantages. One advantage is the improved comfort and safety which results from not having to wear headphones in a hands-free portable communication system, and more generally, not having to cover the ears of the user. Another advantage is improved convenience afforded by having access to and control of many audio sources. For example, if the telephone rings while one is listening to music, a user of embodiments of the present invention can reduce the volume of the music and answer the phone without having to physically run to a stereo to turn down the music and then run to the telephone. A further advantage is the inconspicuous nature of incorporating the audio input and output devices in the shirt or other garment. Potential problems of public identity and decorum in work and social settings are obviated by the stealth nature of the devices.

A still further advantage results from the fact that a person will often speak and interact differently when a microphone is aimed at him/her. Embodiments of the present invention allow a more natural, less stilted conversation in the presence of others. Yet another advantage is in providing the ability for a user to set her own availability, and control her own soundscape. These are potentially beneficial in the domains of stress and mood management.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. For use with a communication device which includes a receiver capable of receiving at least one transmitted signal and producing a first audio signal based thereupon, and a transmitter capable of transmitting a second signal in dependence upon a second audio signal, an audio interface apparatus comprising:

a garment member to be worn on the upper torso of a person, the garment member including a neck opening with a collar extending therearound allowing extension therethrough of the neck of the person;

an audio output device disposed within the collar so as to be hidden from ordinary view, the audio output device coupled to the receiver to produce sound waves representative of the first audio signal; and an audio input device concealed by the collar so as to be hidden from ordinary view and coupled to the transmitter to provide the second audio signal representative of sound waves received thereby.

2. The apparatus of claim 1 wherein the garment member comprises a shirt.

3. The apparatus of claim 1 wherein the audio input device includes a plurality of microphones at least two of which are located on generally opposite sides of the neck opening so that sound received by the at least two microphones is similar to that received by two ears of a wearer.

4. The apparatus of claim 1 wherein the input device captures a spatialized audio input indicative of a spatial relationship between various sound sources and the input device.

5. The apparatus of claim 4 wherein the input device captures audio inputs only from selected directions.

6. The apparatus of claim 1 wherein the audio output device comprises a plurality of speakers.

7. The apparatus of claim 6 wherein at least two of the plurality of speakers are located on generally opposite sides of the neck opening.

8. The apparatus of claim 6 wherein the audio output device provides a spatialized audio output by controlling amplitude and phase of the audio output.

9. The apparatus of claim 6 wherein the audio output device provides an output in a selected direction electronically controllable by a wearer.

* * * * *